United States Patent
Tsuji et al.

(10) Patent No.: US 7,781,014 B2
(45) Date of Patent: Aug. 24, 2010

(54) PROCESS FOR PRODUCING A FILTER CATALYST

(75) Inventors: Makoto Tsuji, Kakegawa (JP); Daisuke Oki, Kakegawa (JP); Koji Senda, Seto (JP)

(73) Assignee: Cataler Corporation, Kakegawa-shi (JP)

( * ) Notice: Subject to any disclaimer, the term of this patent is extended or adjusted under 35 U.S.C. 154(b) by 948 days.

(21) Appl. No.: 10/568,427

(22) PCT Filed: Feb. 10, 2005

(86) PCT No.: PCT/JP2005/002528
§ 371 (c)(1), (2), (4) Date: Feb. 14, 2006

(87) PCT Pub. No.: WO2005/075051
PCT Pub. Date: Aug. 18, 2005

(65) Prior Publication Data
US 2006/0287193 A1  Dec. 21, 2006

(30) Foreign Application Priority Data
Feb. 10, 2004  (JP)  ............................. 2004-033940

(51) Int. Cl.
B05D 1/36  (2006.01)
(52) U.S. Cl. ............... 427/205; 427/376.2; 427/199
(58) Field of Classification Search .............. 427/199, 427/205, 376.2
See application file for complete search history.

(56) References Cited

U.S. PATENT DOCUMENTS

| 4,293,357 A | * | 10/1981 | Higuchi et al. | ........... | 156/89.22 |
|---|---|---|---|---|---|
| 5,127,960 A | | 7/1992 | Dittrich et al. | | |
| 5,165,970 A | | 11/1992 | Schmidt et al. | | |
| 5,182,140 A | * | 1/1993 | Watanabe et al. | ........... | 427/230 |

FOREIGN PATENT DOCUMENTS

EP  0 327 880 A2  8/1989

(Continued)

*Primary Examiner*—Roberts Culbert
(74) *Attorney, Agent, or Firm*—Oliff & Berridge, PLC

(57) ABSTRACT

To provide a process for producing a filter catalyst which can produce a filter catalyst in which the closure of ventilation holes by a catalytic layer is inhibited.

A process for producing a filter catalyst according to the present invention is characterized in that, in a process for producing a filter catalyst, the process comprising: a step of preparing a coating slurry in which an inorganic oxide powder is dispersed, and coating the coating slurry onto a catalyst-support substrate composed of a porous material having a plurality of cells extending in the axial direction; a step of removing the coating slurry in excess from the catalyst-support substrate with the coating slurry coated; and a step of drying-calcining the coating slurry; the removing of the coating slurry in excess is carried out by performing the following steps repeatedly: a step of holding one of the axial opposite ends of the catalyst-support substrate and another axial opposite end thereof in such a state that a pressure difference is given therebetween; and a step of holding the one of the opposite ends of the catalyst-support substrate and the other opposite end thereof in an identical pressure state. The present production process can produce a filter catalyst in which sufficient ventilation property is secured so that it has come not to induce the rise of pressure loss.

6 Claims, 4 Drawing Sheets

FOREIGN PATENT DOCUMENTS

| | | |
|---|---|---|
| JP | A-09-505238 | 5/1997 |
| JP | A 9-173866 | 7/1997 |
| JP | A 9-220423 | 8/1997 |
| JP | A 2000-202307 | 7/2000 |
| JP | A-2002-066338 | 3/2002 |
| JP | 2002204958 A * | 7/2002 |
| JP | A-2002-295226 | 10/2002 |
| JP | A 2003-161137 | 6/2003 |
| JP | A-2003-210986 | 7/2003 |
| JP | A-2003-225575 | 8/2003 |
| JP | A 2003-236392 | 8/2003 |
| JP | A 2004-97958 | 4/2004 |
| WO | WO 95/21022 | 8/1995 |

\* cited by examiner

PROCESS FOR PRODUCING A FILTER CATALYST

TECHNICAL FIELD

The present invention relates to a process for producing a filter catalyst which removes particulates at least, particulates which are one of substances included in exhaust gases emitted from internal combustion engines, such as diesel engines, to purify the exhaust gases.

BACKGROUND ART

In exhaust gases which are emitted from internal combustion engines, such as diesel engines, particulates are included. In the particulates, substances which are harmful to human bodies are included, and it has become an environmental assignment to remove them.

For removing the particulates, filter catalysts have been used. A conventional filter catalyst has a construction in which a catalytic layer comprising a loading layer composed of alumina, and the like, and a catalytic metal loaded on the loading layer is formed on a catalyst-support substrate composed of porous ceramic having chained pores. And, when exhaust gases pass the ventilation holes formed by the chained pores of the catalyst-support substrate, it captures and decomposes the particulates. At this moment, if the ventilation holes are not formed in the filter catalyst to the extent that the exhaust gases pass, the captured particulates deposit to close the ventilation holes so that the pressure loss increases when the exhaust gases pass. When the opening diameters of the ventilation holes are enlarged in order to reduce the pressure loss, it has become impossible to capture the particulates.

The conventional filter catalyst has been produced by forming a loading layer by preparing a coating slurry, such as alumina, coating this coating slurry onto a catalyst-support substrate, and drying-calcining it (coating); and thereafter loading a catalytic ingredient thereon. For example, it is described in Japanese Unexamined Patent Publication (KOKAI) No. 9-173,866 or Japanese Unexamined Patent Publication (KOKAI) No. 9-220,423.

In Japanese Unexamined Patent Publication (KOKAI) No. 9-173,866, there is set forth a production process in which coating is carried out by immersing a catalyst-support substrate into an alumina slurry and taking it up therefrom, and thereafter suctioning the alumina slurry in excess with an air cleaner, or blowing it off with a compressed air.

In Japanese Unexamined Patent Publication (KOKAI) No. 9-220,423, there is set forth a production process in which coating is carried out by pouring a coating slurry into a catalyst-support substrate, whose axial direction is disposed vertically, through the top end, or pushing up the coating slurry through the bottom end, to coat the slurry, and suctioning the coating slurry in excess by decompressing the bottom-end side, or washing away the coating slurry by pressurizing the top-end side.

However, in the production methods set forth in the aforementioned respective publications, there have been such a problem that the produced catalytic layer narrows down the opening diameters of the ventilation holes or closes the pores of the catalyst-support substrate. To be more precise, the removing of the excessive coating slurry from the catalyst-support substrate with the coating slurry coated has been carried out by giving a large pressure difference to the both opposite ends of the catalyst-support substrate at once. In such a method, the particles constituting the coating slurry, such as alumina, come to be present un-uniformly within the pores of the catalyst-support substrate. And, since they are dried-calcined in this state, the produced catalytic layer comes to narrow down the opening diameters of the ventilation holes or close them.

Moreover, since the pores of the catalyst-support substrate are small, the ventilation holes of the obtained catalytic layer come to be closed, when the particle diameters of the particles constituting the coating slurry become large. Further, the coating slurry does not distribute inside the pores of the catalyst-support substrate so that the catalytic layer comes to be formed on the surface of the catalyst-support substrate, when the particle diameters of the particles constituting the coating slurry become large. Specifically, the catalytic layer is formed on the surface of the catalyst-support substrate, and this catalytic layer closes the pores of the catalyst-support substrate so that no sufficient ventilation property as filter catalyst comes to be secured. When no ventilation property comes to be secured, the pressure loss heightens so that loads come to be applied to engines.

DISCLOSURE OF THE INVENTION

The present invention has been done in view of the aforementioned circumstances, and it is an assignment to provide a process for producing a filter catalyst, process which can produce a filter catalyst in which the closure of the ventilation holes by the catalytic layer is inhibited.

The inventors of the present invention inquired into the production processes of the filter catalyst over and over again, as a result, they found out that, after coating a coating slurry for forming a catalytic layer onto a catalyst-support substrate and when removing the excessive coating slurry, it is possible to uniformly coat the coating slurry even within the pores of the catalyst-support substrate by repeating suction by means of pressure difference.

Specifically, a process of the present invention for producing a filter catalyst is characterized in that, in a process for producing a filter catalyst, the process comprising: a step of preparing a coating slurry in which an inorganic oxide powder is dispersed, and coating the coating slurry onto a catalyst-support substrate composed of a porous material having a plurality of cells extending in the axial direction; a step of removing the coating slurry in excess from the catalyst-support substrate with the coating slurry coated; and a step of drying-calcining the coating slurry; the removing of the coating slurry in excess is carried out by performing the following steps repeatedly: a step of holding one of the axial opposite ends of the catalyst-support substrate and another axial opposite end thereof in such a state that a pressure difference is given therebetween; and a step of holding the one of the opposite ends of the catalyst-support substrate and the other opposite end thereof in an identical pressure state.

The pressure difference given between the both opposite ends of the catalyst-support substrate can preferably be 1 KPa or more in the step of holding the both opposite ends of the catalyst-support substrate in such a state that a pressure difference is given therebetween.

The inorganic oxide powder dispersed in the coating slurry can preferably be such that a 70% particle-diameter value (D70) of a particle-diameter cumulative distribution is 1 μm or less.

BEST MODE FOR CARRYING OUT THE INVENTION

Figure 1:
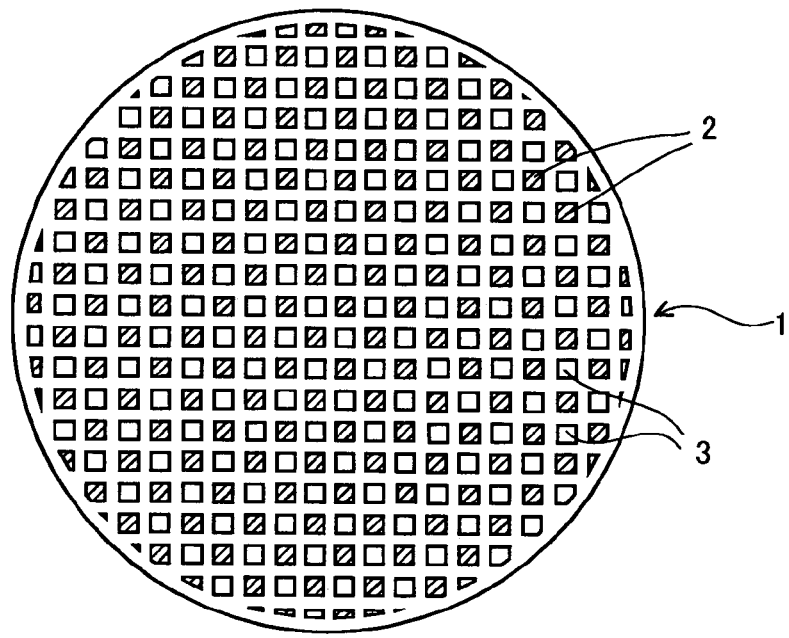
FIG. 1 is a top-surface diagram for illustrating an opposite end-surface of a catalyst-support substrate.

Hereinafter, regarding inventions which further concretize said invention and the embodiment modes of these inventions, they will be described.

MODE FOR CARRYING OUT THE INVENTION

The process of the present invention for producing a filter catalyst comprises a step of preparing a coating slurry in which an inorganic oxide powder is dispersed, and coating the coating slurry onto a catalyst-support substrate composed of a porous material having a plurality of cells extending in the axial direction; a step of removing the coating slurry in excess from the catalyst-support substrate with the coating slurry coated; and a step of drying-calcining the coating slurry. The production process of the present invention can produce a filter catalyst in which a loading layer is formed on the surface of the catalyst-support substrate composed of the porous material and a catalytic layer, which is completed by loading a catalytic metal on this loading layer, is formed.

The production process of the present invention is such that the removing of the coating slurry in excess is carried out by performing the following steps repeatedly: a step of holding one of the axial opposite ends of the catalyst-support substrate and another axial opposite end thereof in such a state that a pressure difference is given therebetween; and a step of holding the one of the opposite ends of the catalyst-support substrate and the other opposite end thereof in an identical pressure state. That is, since the removing of the coating slurry in excess is completed by carrying out the suction using the pressure difference repeatedly, the coating slurry comes to be coated as well inside the pores of the catalyst-support substrate. And, since it is dried and calcined in the subsequent step, it becomes possible to coat the catalytic layer in a uniform thickness on the surface of the catalyst-support substrate.

The state that a pressure difference is given between one of the axial opposite ends of the catalyst-support substrate and another axial opposite end thereof is a state in which a pressure difference is induced between the both opposite ends of the plural cells which extend in the axial direction of the catalyst-support substrate. When a pressure difference is given, the coating slurry is suctioned from the higher-pressure ends toward the lower-pressure ends. Note that the pressure difference is a relative pressure difference, and it does not matter if all of the pressures at both of the opposite ends are higher or lower than the atmospheric pressure. It is further preferable to adapt one of the opposite ends to the atmospheric pressure and to adapt the other opposite end to a pressure which is lower than the atmospheric pressure.

In the step of holding the both opposite ends of the catalyst-support substrate in a such a state that a pressure difference is given therebetween, the pressure difference given between the opposite ends of the catalyst-support substrate can preferably be 1 KPa or more. That is, the pressure difference between the pressure at the opposite end on a high-pressure side and the pressure at the opposite end on a low-pressure side can preferably be 1 KPa or more. When the pressure difference becomes less than 1 KPa, the pressure difference is so small that it comes to take time for the suction of the coating slurry. It can further preferably be 10 KPa or more. Moreover, the upper limit of the pressure difference is not limited in particular, however, when it becomes large excessively, it becomes a cause of the segregation of inorganic oxide obtained by coating. It can preferably be 100 KPa or less.

The inorganic oxide powder dispersed in the coating slurry can preferably be such that a 70% particle-diameter value (D70) of a particle-diameter cumulative distribution can preferably is 1 μm or less. By regulating the particle diameter of the inorganic oxide powder constituting the coating slurry, it is possible to regulate the pore diameters of the catalytic layer. That is, since the coating slurry composed of a small-particle-diameter inorganic oxide powder can enter deep inside the pores of the catalyst-support substrate with ease, it comes to be coated in a uniform thickness on the surface of the catalyst-support substrate including the inner surface of the pores when repeating the suction using the pressure difference. In the present invention, the particle-diameter distribution of the inorganic oxide powder can be obtained using a particle-size-distribution measuring apparatus.

Except that the removal of the excessive coating slurry from the coating slurry coated on the catalyst-support substrate is carried out by repeating the aforementioned steps, the production process of the present invention can produce it in the same manner as the conventional processes for producing a filter catalyst.

As for the inorganic oxide constituting the coating slurry, it is possible to name one or more members selected from the group consisting of transition metal oxides, such as $Al_2O_3$, $SiO_2$, $TiO_2$, $ZrO_2$ and $CeO_2$, rare-earth element oxides, alkali metal oxides, alkaline-earth metal oxides, and composite oxide of these.

The production process of the present invention comprises a step of loading a catalytic metal. The catalytic metal is a substance which burns the particulates captured at the filter catalyst. As for the catalytic metal, it is possible to name at least one member selected from precious metals, such as Pt, Pd, Rh, Ir, Ag and Au. The loading of the catalytic metal can be loaded by methods, such as a method in which a catalytic metal solution is prepared and the catalyst-support substrate with the loading layer formed on the surface, catalyst-support substrate which is produced by performing the aforementioned respective steps, and it is dried and calcined, and a method in which the catalytic layer is formed along with the loading layer by dispersing the catalytic metal in the coating slurry.

In the production process of the present invention, the coating amount of the coating slurry can preferably be such that the coating amount (conversion into oxide particles) per (apparent) 1-liter volume of the catalyst-support substrate is 50-150 g. The coating amount of the coating slurry was found from the weights before and after the coating.

The catalyst-support substrate is one in which the catalytic layer is formed on the surface, and it is not limited in particular as far as it is a substrate which can form pores with desired pore diameters when the catalytic layer is formed. The catalyst-support substrate can preferably have pores whose pore diameters are 20 μm or more in a porosity of 40% or more, and can further preferably have pores whose pore diameters are 10 μm or more in a porosity of 50% or more. Note that the upper limit of the pore diameters of the pores of the catalyst-support substrate is not limited in particular, however, it becomes difficult to form the pore diameters of desired sizes in the catalytic layer when they become large excessively.

The catalyst-support substrate can be satisfactory as far as it is composed of a porous material and has the constitution having a large number of cells extending in the axial direction, and can use substrates which have been used as catalyst-support substrates in the conventional filter catalysts. For example, it is possible to use wall-flow DPF (diesel particulates filter), which is composed of cordierite, SiC and the other heat-resistant ceramic, ceramic foam filters, and metallic nonwoven-cloth DPF. It can furthermore preferably be a wall-flow DPF made of cordierite.

The coating of the coating slurry onto the surface of the catalyst-support substrate can be carried out using methods, such as a method in which the catalyst-support substrate is immersed into the coating slurry, and a method in which the coating slurry is injected into each of the cells through an axial opposite end.

It is possible to carry out the removal of the excessive coating slurry from the catalyst-support substrate with the coating slurry coated using an apparatus which can give the pressure difference to the both opposite ends of the catalyst-support substrate. That is, using an apparatus which can vary at least one of the pressures at the opposite ends of the catalyst-support substrate at least, the removal of the excessive coating slurry is carried out.

During the removal of the excessive slurry, the holding time for giving the pressure difference to the both opposite ends of the catalyst-support substrate and holding them thereat, and the holding time for holding them without giving the pressure difference are not limited in particular. Preferably, they can be 5-180 seconds, respectively, more preferably, they can be 5-30 seconds.

The catalyst-support substrate with the excessive coating slurry removed is such that the loading layer, or the catalytic layer can be formed by calcining after drying. The drying of the coating slurry inhibits the coating slurry's water (or dispersion medium) from damaging the coated layer, which is completed by coating the coated coating slurry, in the calcination. The calcination is carried out at a temperature and for a time period, temperature and time period which allow the coating slurry on the surface of the catalyst-support substrate to form a porous oxide layer (the loading layer, or the catalytic layer).

EXAMPLES

Hereinafter, the present invention will be described using examples.

As an example of the present invention, a production of a filter catalyst was carried out.

Example No. 1

First of all, 1,500-g alumina ($Al_2O_3$) powder and 2,000-g water were weighed, the alumina powder was charged into the water, was dispersed therein by stirring, and was subjected to wet milling, thereby preparing a coating slurry. Note that the 70% particle-diameter value (D70) of the alumina powder's particle-diameter cumulative distribution was 0.9 μm.

In the present invention, the measurement of D70 was carried out using a particle-size measuring apparatus (produced by HORIBA SEISAKUSHO, Name of Article: LA500). The measurement by the particle-size measuring apparatus was carried out after preparing a suspension, in which 0.1-g sample was suspended in about-300-ml water, irradiating an ultrasonic wave to this suspension for 10 minutes and dispersing the measurement sample sufficiently.

Subsequently, the coating slurry was coated on a catalyst-support substrate.

The catalyst-support substrate is a catalyst-support substrate (produced by DENSO) which has axially-extending cells demarcated by cellular walls whose thickness is 300 μm in a quantity of 48 cells/$cm^2$ (about 300 cells/$inch^2$), which is formed as a cylinder shape substantially, whose apparent volume is 2 liters, and which is made of cordierite. This catalyst-support substrate has pores whose pore diameters are 20 μm or more in a porosity of 40% or more. This catalyst-support substrate 1 is such that one of the two openings, which are formed at the both opposite ends of the respective cells, is sealed alternately with a sealing material 2. That is, about half of the large number of the cells are opened in one of the opposite end-surfaces, and the rest of them are opened in the other one of the opposite end-surfaces. In the opposite end-surfaces of the catalyst-support substrate 1, the sealed cells 2 and the opened cells 3 are lined up alternately. Therefore, the opposite end-surfaces of the catalyst-support substrate 1 become like checkered patterns. An opposite end-surface of the catalyst-support substrate 1 is illustrated in FIG. 1.

The coating of the coating slurry onto the catalyst-support substrate was carried out by immersing the catalyst-support substrate into the coating slurry, removing the excessive slurry after taking it up therefrom, and thereafter drying and calcining it. Note that, in the present example, the removal of the excessive coating slurry was done by repeating a pressure fluctuation, in which the coating slurry was suctioned by holding it in a such state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the coating slurry coated on the catalyst-support substrate became a predetermined weight. Note that, during the production of the present example, since the suction of the slurry was carried out through the respective opposite-end sides of both opposite ends, the pressure fluctuation was done twice. Moreover, the calcination was carried out by heating it at 500° C. for 1 hour.

When the weight of the coated catalyst-support substrate was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as an NOx sorbing component in filter catalysts.

In accordance with the above procedures, a filter catalyst of Example No. 1 was produced.

Example No. 2

Except that the pressures given to the catalyst-support substrate during the removal of the excessive slurry differed, a filter catalyst of the present example was produced in the same manner as Example No. 1.

First of all, 1, 500-g alumina powder and 2,000-g water were weighed, the alumina powder was charged into the water, was dispersed therein by stirring, and was subjected to wet milling, thereby preparing a slurry. Note that the D70 of the alumina powder was 0.9 μm.

The coating slurry was coated onto the same catalyst-support substrate as the one used in Example No. 1. The coating of the coating slurry onto the catalyst-support support substrate was carried out by immersing the catalyst-support substrate into the coating slurry, removing the excessive slurry after taking it up therefrom, and thereafter drying and calcining it. Note that, in the present example, the removal of the excessive coating slurry was done by repeating a pressure fluctuation, in which the coating slurry was suctioned by holding the other one of the opposite ends in such a state that it was pressurized to 152.0 KPa (1.5 atm), while holding one of the opposite ends in such a state that it was opened, for 5-30 seconds, thereby discharging the coating slurry through the one of the opposite ends; and thereafter holding it for 5-30 seconds after putting the pressure of the other of the opposite ends back to the atmospheric pressure. This pressure fluctuation was repeated until the coating slurry coated on the catalyst-support substrate became a predetermined weight. Note that, during the production of the present example, the suction of the slurry was carried out through the respective opposite-end sides of both opposite ends, and the pressure fluctuation was done three times. Moreover, the calcination was carried out by heating it at 500° C. for 1 hour.

When the weight of the coated catalyst-support substrate was weighed, it was increased by 300 g more than the weight before coating the coating slurry. That is, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as an NOx sorbing component in filter catalysts.

In accordance with the above procedures, a filter catalyst of Example No. 2 was produced.

Comparative Example No. 1

Except that the removal of the excessive slurry was adapted to air blowing, a filter catalyst of the present comparative example was produced in the same manner as Example No. 1.

First of all, 1,500-g alumina powder and 2,000-g water were weighed, the alumina powder was charged into the water, was dispersed therein by stirring, and was subjected to wet milling, thereby preparing a slurry. Note that the D70 of the alumina powder's particle-diameter cumulative distribution was 0.9 μm.

The coating slurry was coated onto the same catalyst-support substrate as the one used in Example No. 1. The coating of the coating slurry onto the catalyst-support support substrate was carried out by immersing the catalyst-support substrate into the coating slurry, removing the excessive slurry after taking it up therefrom, and thereafter drying and calcining it. Note that, in the present example, the removal of the excessive coating slurry was done by spraying a pressurized air to one of the opposite ends at 506.5 KPa (5 atm) in the axial direction of the cells. This air blowing was repeated until the coating slurry coated on the catalyst-support substrate became a predetermined weight. Moreover, the calcination was carried out by heating it at 500° C. for 1 hour.

When the weight of the coated catalyst-support substrate was weighed, it was increased by 300 g more than the weight before coating the coating slurry. That is, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and, calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as an NOx sorbing component in filter catalysts.

In accordance with the above procedures, a filter catalyst of Comparative Example No. 1 was produced.

Comparative Example No. 2

The present comparative example is such that, except that the particle size of the alumina powder in the coating slurry was large, a filter catalyst of the present comparative example was produced in the same manner as Example No. 1.

First of all, 1,500-g alumina powder and 2,000-g water were weighed, the alumina powder was charged into the water, was dispersed therein by stirring, and was subjected to wet milling, thereby preparing a slurry. Note that the D70 of the alumina powder was 5 μm.

The coating slurry was coated onto the same catalyst-support substrate as the one used in Example No. 1. The coating of the coating slurry onto the catalyst-support support substrate was carried out by immersing the catalyst-support substrate into the coating slurry, removing the excessive slurry after taking it up therefrom, and thereafter drying and calcining it. Note that, in the present example, the removal of the excessive coating slurry was done by repeating a pressure fluctuation, in which the coating slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the coating slurry coated on the catalyst-support substrate became a predetermined weight. Note that, during the production of the present comparative example, the suction of the slurry was carried out through the respective opposite-end sides of both opposite ends, and the pressure fluctuation was done five times. Moreover, the calcination was carried out by heating it at 500° C. for 1 hour.

When the weight of the coated catalyst-support substrate was weighed, it was increased by 300 g more than the weight before coating the coating slurry. That is, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as an NOx sorbing component in filter catalysts.

In accordance with the above procedures, a filter catalyst of Comparative Example No. 2 was produced.

Evaluation

The pore structures of the filter catalysts of the examples and comparative examples were measured using a mercury porosi-meter (produced by SHIMAZU SEISAKUSHO, name of article: Autopore 9200). The measurement results are set forth in Table 1. Note that the operation of the mercury porosi-meter was carried out by increasing the mercury press-fitting pressure between 0-200 MPa in the measurement of the pore structures.

TABLE 1

| | Porosity (%) in Pore Diameter | | | | | | | | |
| --- | --- | --- | --- | --- | --- | --- | --- | --- | --- |
| | 1-5 (μm) | 5-10 (μm) | 10-20 (μm) | Total in 1-20 (μm) | 20-40 (μm) | 40-70 (μm) | 70-150 (μm) | 150-300 (μm) | Total in 1-300 (μm) |
| Ex. No. 1 | 1.80 | 1.91 | 8.82 | 12.53 | 22.64 | 5.39 | 2.98 | 2.65 | 46.19 |
| Ex. No. 2 | 2.09 | 2.02 | 9.18 | 13.29 | 21.90 | 5.22 | 3.11 | 2.90 | 46.42 |
| Comp. Ex. No. 1 | 1.12 | 1.76 | 7.81 | 10.69 | 20.58 | 6.38 | 3.57 | 2.76 | 43.98 |
| Comp. Ex. No. 2 | 0.98 | 1.55 | 7.21 | 9.74 | 22.46 | 9.12 | 4.81 | 3.56 | 49.69 |

Figure 2:
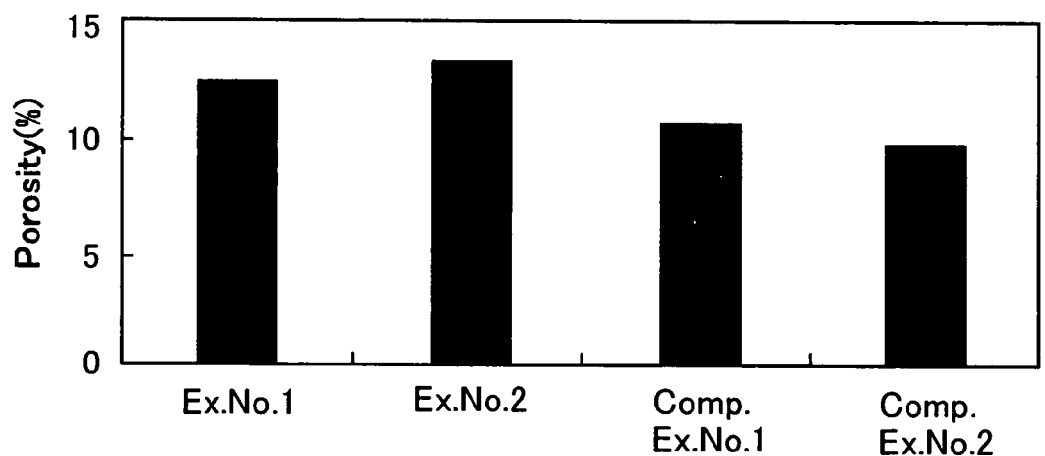
FIG. 2 is a graph for illustrating the porosity of pore diameters of 1-20 μm.
Figure 3:
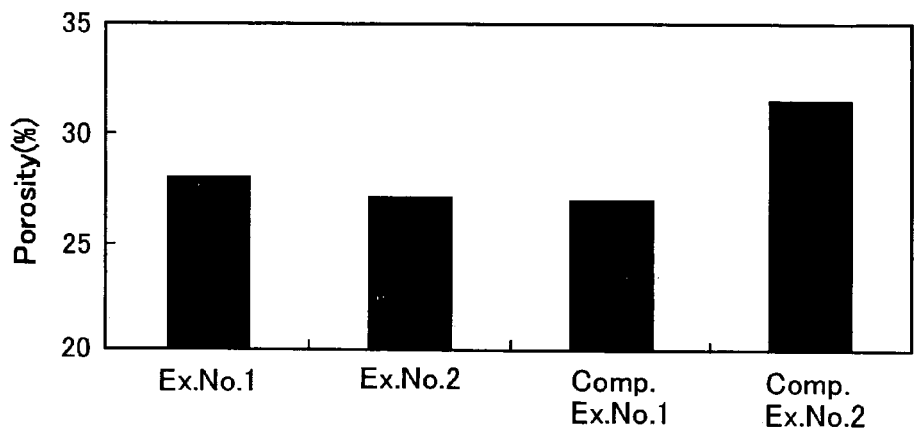
FIG. 3 is a graph for illustrating the porosity of pore diameters of 20-70 μm.

The porosities of the filter catalysts of the examples and comparative examples set forth in Table 1 are separated at 20 μm or less and 20 μm or more, and are illustrated in FIGS. 2 and 3. In FIG. 2, there are shown the porosities of 1-to-20-μm pore diameters, and, in FIG. 3, there are shown the porosities of 20-to-70-μm pore diameters.

From Table 1 and both drawings, it is understood the filter catalyst of the respective examples are such that pores of 1-to-20-μm diameters are present abundantly, but pores of 20-to-70-μm diameters are less.

Figure 4:
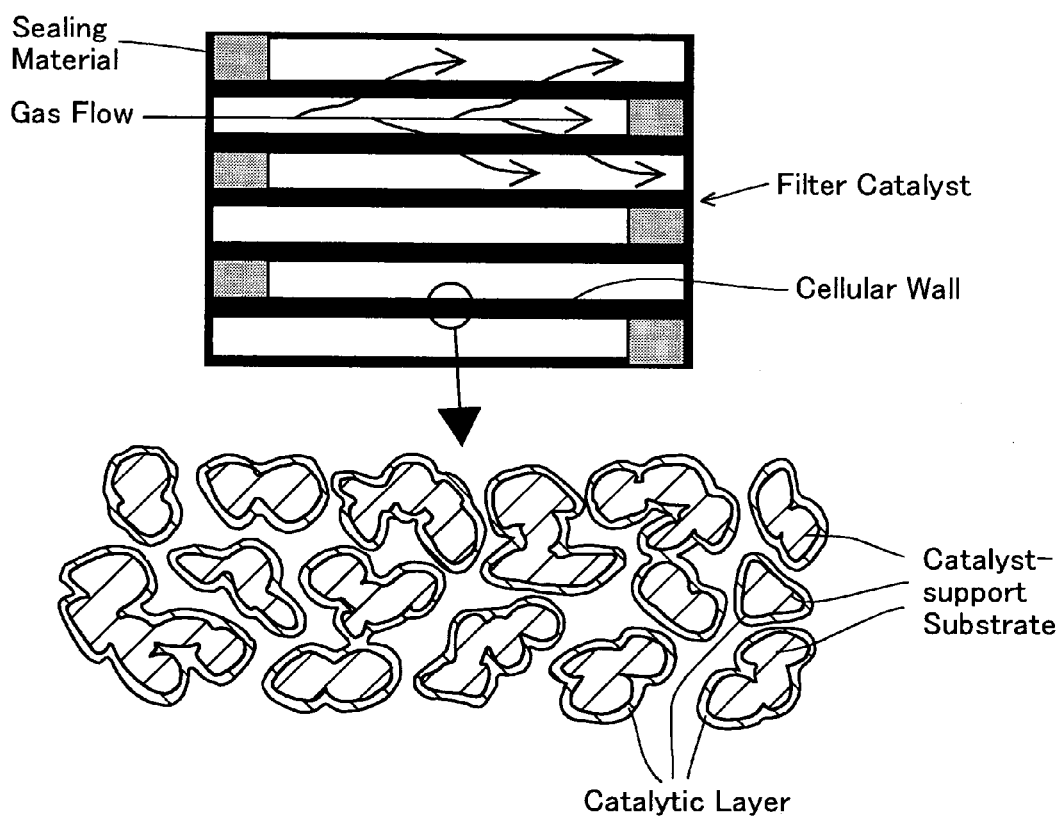
FIG. 4 is an enlarged cross-sectional diagram of a filter catalyst of Example No. 1.

Specifically, the filter catalysts of the respective examples are such that uniform-thickness catalytic layers are formed even inside the pores regardless of the sizes of the pores in the catalyst-support substrate as shown in FIG. 4. Thus, the pores of 1-to-20-μm diameters in the catalyst-support substrate are such that the pore diameters are made smaller by the catalytic layers, and the pores of 20-μm-or-more diameters in the catalyst-support substrate are such that the pore diameters are made smaller by the catalytic layers so that they have turned into pores of 20-μm-or-more diameters.

On the contrary, the filter catalysts of the respective comparative examples are such that pores of 1-to-20-μm diameters are less, but pores of 20-to-70-μm diameters are present abundantly.

Figure 5:
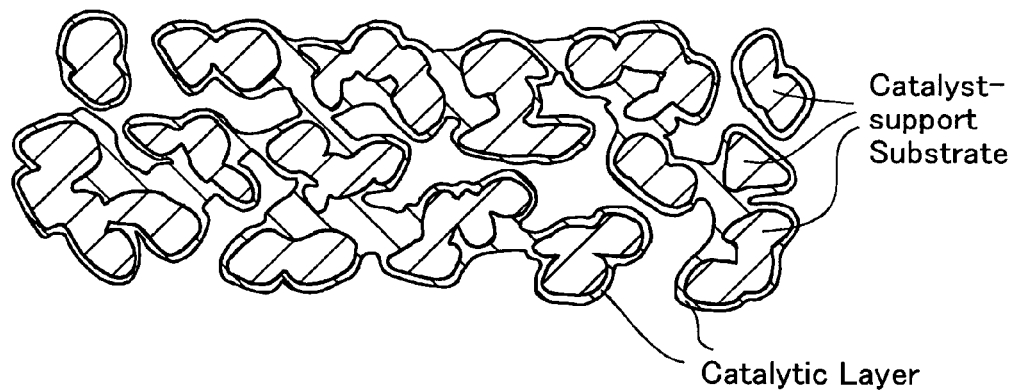
FIG. 5 is an enlarged cross-sectional diagram of a filter catalyst of Comparative Example No. 1.
Figure 6:
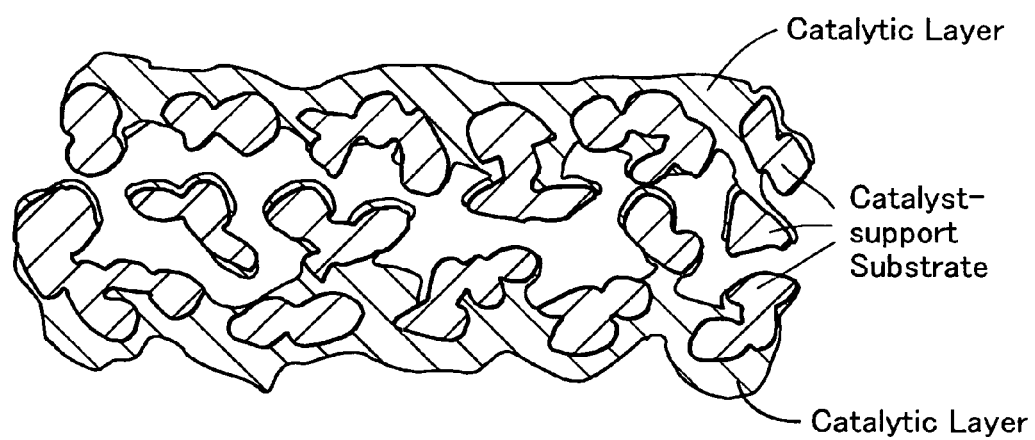
FIG. 6 is an enlarged cross-sectional diagram of a filter catalyst of Comparative Example No. 2.

Specifically, the filter catalyst of Comparative Example No. 1 is such that the pores of 1-to-20-μm diameters in the catalyst-support substrate are such that the pores are closed by the catalytic layer, and the pores of 20-μm-or-more diameters in the catalyst-support substrate have remained as the pores of 20-μm-or-more diameters because the catalytic layer is thin, as shown in FIG. 5. Further, the filter catalyst of Comparative Example No. 2 is such that the pores of 1-to-20-μm diameters in the catalyst-support substrate are such that the pores are closed by the catalytic layer, which are formed at their openings, and the pores of 20-μm-or-more diameters in the catalyst-support substrate have remained as the pores of 20-μm-or-more diameters, though the catalytic layer is present at their openings, as shown in FIG. 6. Note that FIG. 5 and FIG. 6 are diagrams which illustrate the same cross section as the enlarged cross-sectional diagram of the cellular walls in FIG. 4.

Measurement of Pressure Loss

Subsequently, the measurement of the pressure losses of the filter catalysts of the examples and comparative examples was carried out.

Figure 7:
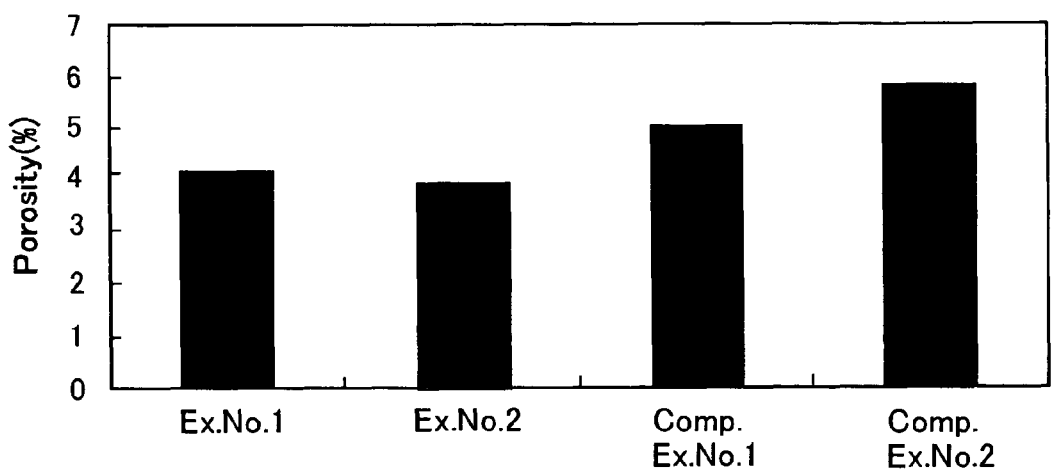
FIG. 7 is a graph for illustrating the measurement results of the pressure losses of the filter catalysts of examples and comparative examples.

First of all, the filter catalysts (which were subjected to the pressure-loss measurement) were put into place in an exhaust system of a vehicle which had a 2-liter-displacement turbocharger-type direct-injection diesel engine. In this instance, pressure sensors were installed in front of and at the rear of the filter catalysts of the exhaust system. And, a steady operation was carried out for 2 hours at a revolution speed of 2,000 rpm and with a torque of 30 N·m. The deposition amount of particulates under this condition was 3 g per 1-liter apparent deposition of the filter catalysts. After 2 hours, that is, at the time when particulates were deposited in an amount of 3 g per 1-liter apparent volume of the filter catalysts, the pressure losses were measured, and the measurement results are illustrated in FIG. 7. Note that the pressure losses were found from the differences of the pressures which were measured at the two pressure sensors in front of and at the rear the filter catalysts.

From FIG. 7, it was confirmed that the filter catalysts of the respective examples were such that the pressure losses became lower, compared with the filter catalysts of the respective comparative examples. That is, the filter catalysts of the respective examples are such that the permeable holes, which are completed by continuing the pores and through which exhaust gases pass, have remained. On the other hand, the filter catalysts of the respective comparative examples are such that the permeable holes are closed by the catalytic layer and the deposited particulates further close the permeable holes to raise the pressure losses.

Figure 8:
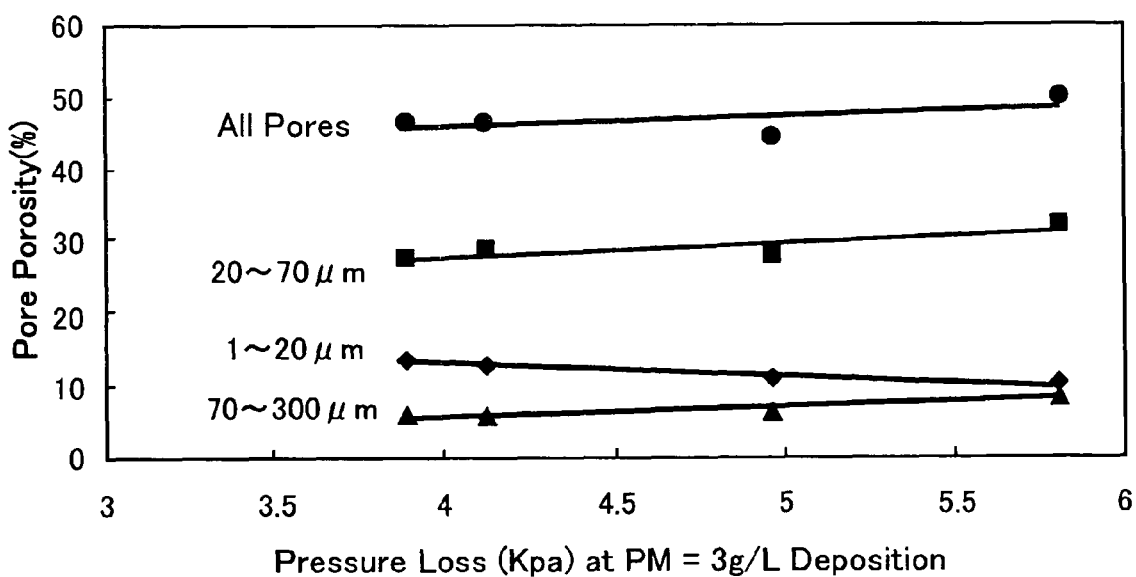
FIG. 8 is a graph for illustrating the relationships between the pores and pressure losses of the filter catalysts of examples and comparative examples.

The relationships between this measurement result of the pressure losses and the porosity for every pore diameter of the pores of the filter catalysts are set forth in Table 2 and FIG. 8.

TABLE 2

| | Pressure Loss (KPa) | Porosity in Pore Diameter (%) | | | |
| --- | --- | --- | --- | --- | --- |
| | | 1-20 (μm) | 20-70 (μm) | 70-300 (μm) | Total of 1-300 μm |
| Ex. #1 | 4.12 | 12.53 | 28.03 | 5.63 | 46.19 |
| Ex. #2 | 3.89 | 13.29 | 27.11 | 6.01 | 46.42 |
| Comp. Ex. #1 | 4.96 | 10.69 | 26.96 | 6.33 | 43.98 |
| Comp. Ex. #2 | 5.81 | 9.74 | 31.58 | 8.37 | 49.69 |

As illustrated in FIG. 8, even when the porosity of all of the pores rises slightly, the pressure losses of the filter catalysts rise remarkably. That is, it is seen that the entire porosity of the filter catalysts and the pressure loss do not exhibit any correlation.

And, as the porosity of the 20-to-70-μm-diameter pores of the filter catalysts and the porosity of the 70-to-200-μm-diameter pores rise, and as the porosity of the 1-to-20-μm-diameter pores decrease, the pressure loss becomes high. That is, the porosity of the 20-μm-or-more-diameter pores rises and the porosity of the less-than-20-μm-diameter pores decreases so that the pressure loss rises, and it is understood that the porosity of the less-than-20-μm-diameter pores and the pressure loss exhibits a correlation. That is, it is understood that the catalytic layer was formed even on the surfaces within the pores of the catalyst-support substrate because the filter catalysts of Example Nos. 1 and 2 were such that the 1-to-20-μm-diameter pores were present. That is, it is understood that the coating slurry can be coated on the surfaces, including the inside of the pores of the catalyst-support substrate, in a uniform thickness. As a result, they became filter catalysts in which the pores of the catalyst-support substrate are not closed and the ventilation property is secured sufficiently.

Since the filter catalysts of the respective examples are such that the pressure-loss rise resulting from the deposition of particulates are small, they can capture the particulates without exerting high loads to diesel engines. Accordingly, they have an effect of being capable of capturing and processing the particulates in a much greater amount.

The invention claimed is:

1. A process for producing a filter catalyst, the process comprising:

preparing a coating slurry in which an inorganic oxide powder is dispersed, and coating the coating slurry onto a catalyst-support substrate composed of a porous material having a plurality of cells extending in an axial direction, the catalyst-support substrate having first and second opposite ends in the axial direction, a first set of the cells having sealed first ends, and a second set of the cells which alternate with the first set having sealed second ends;

removing excess coating slurry from the coated catalyst-support substrate; and drying-calcining the coating slurry;

wherein the removing of the excess coating slurry is carried out by performing the following steps repeatedly until a porosity of the filter catalyst with pore diameters between 1 μm to 20 μm is 12.53% to 13.29% and the porosity of the filter catalyst with pore diameters between 20 μm to 70 μm is 27.11% to 28.03%:

maintaining a pressure difference between the first and second opposite ends of the catalyst-support substrate, the pressure difference having a higher pressure at the first end during a first repetition and a higher pressure at the second end during a second repetition; and maintaining an identical pressure at the first and second opposite ends of the catalyst-support substrate.

2. The process of claim 1, wherein the pressure difference between the first and second opposite ends of said catalyst-support substrate is 1 KPa or more.

3. The process of claim 1, wherein said inorganic oxide powder dispersed in said coating slurry is such that a 70% particle-diameter value (D70) of a particle-diameter cumulative distribution is 1 μm or less.

4. The process of claim 1, wherein the pressure difference is carried out by applying atmospheric pressure at the first end and by applying a pressure lower than atmospheric pressure at the second end and vice versa on the first and second repetitions, respectively.

5. A process for producing a filter catalyst, the process comprising:

preparing a coating slurry in which an inorganic oxide powder is dispersed, and coating the coating slurry onto a catalyst-support substrate composed of a porous material having a plurality of cells extending in an axial direction, the catalyst-support substrate having first and second opposite ends in the axial direction, a first set of the cells having sealed first ends, and a second set of the cells which alternate with the first set having sealed second ends;

removing excess coating slurry from the coated catalyst-support substrate; and drying-calcining the coating slurry;

wherein the removing of the excess coating slurry is carried out by performing the following steps repeatedly until a porosity of the filter catalyst with pore diameters between 1 μm to 20 μm is 12.53% to 13.29% and the porosity of the filter catalyst with pore diameters between 20 μm to 70 μm is 27.11% to 28.03%:

maintaining a first pressure difference between the first and second opposite ends of the catalyst-support substrate such that a higher pressure is provided at the first end;

maintaining an identical pressure at the first and second opposite ends of the catalyst-support substrate; and maintaining a second pressure difference between the first and second opposite ends of the catalyst-support substrate such that a higher pressure is provided at the second end.

6. The process of claim 5, wherein the maintaining the first pressure difference includes applying atmospheric pressure to one of the first and second ends, and maintaining the second pressure difference includes applying atmospheric pressure to the other of the first and second ends.

* * * * *